Nov. 10, 1936.  W. F. BAXTER  2,060,751
FISHING HARNESS
Filed April 14, 1936
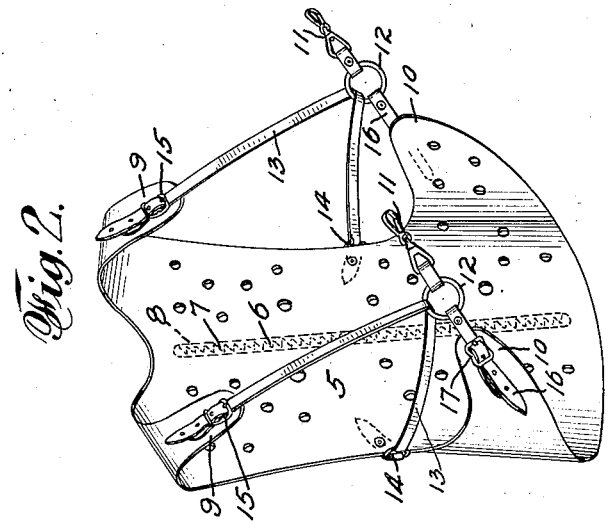
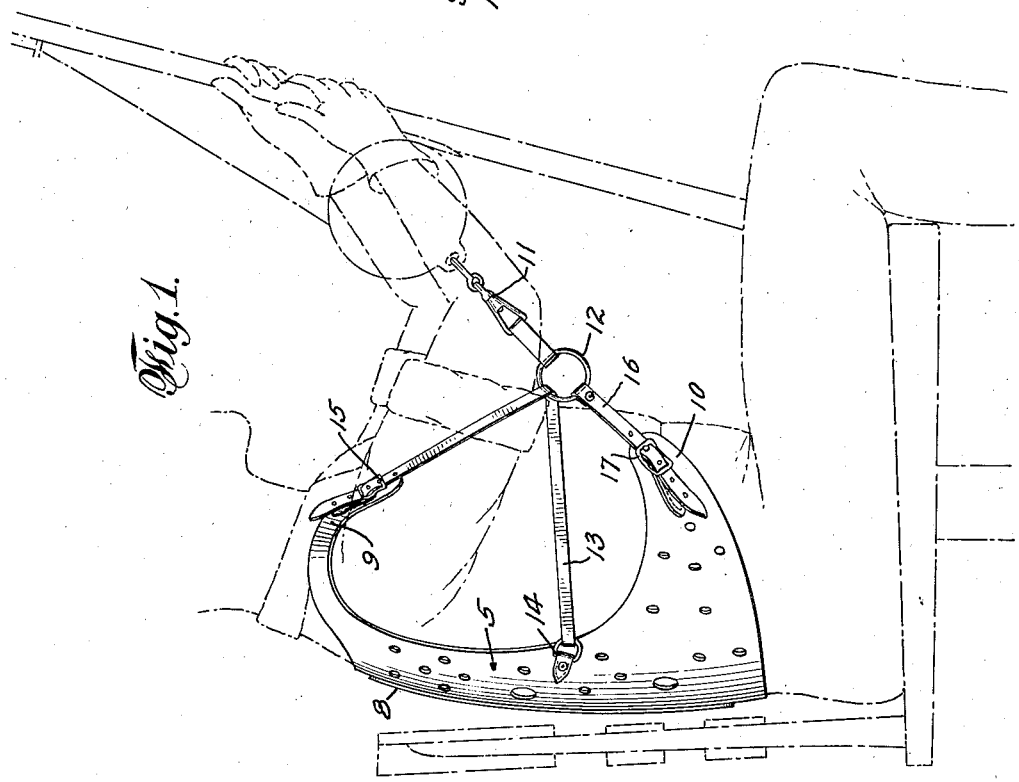
INVENTOR
WILLIAM F. BAXTER
BY
ATTORNEYS.

Patented Nov. 10, 1936

2,060,751

UNITED STATES PATENT OFFICE 2,060,751

FISHING HARNESS

William F. Baxter, Beach Haven, N. J., assignor to Abercrombie & Fitch Company, New York, N. Y., a corporation of New York Application April 14, 1936, Serial No. 74,287

6 Claims. (Cl. 224—5)

My invention relates to a fishing harness.

Heretofore there have been two general types of fishing harness, one type comprising straps or the like fitting over the shoulders, and the other type comprising means fitting about the waist. There have also been variations of these general types. However, all prior types of fishing harness have been faulty in one or more particulars. The shoulder type of harness put all of the strain upon the shoulders and the angler soon tired. The waist type of harness tended to crush the ribs and make breathing difficult. The variations of the two types of harnesses mentioned have not been entirely satisfactory.

It is an object of my invention to provide a fishing harness to overcome the difficulties heretofore present or inherent in fishing harnesses.

It is a more specific object to provide a fishing harness in which the strains on the wearer are substantially equalized, thus causing substantially all parts of the back to assume appropriate portions of the strain and thus cause less fatigue in the angler.

Another object is to provide a fishing harness shaped to the back of the wearer.

In the drawing which shows, for illustrative purposes only, a preferred form of the invention—

Fig. 1 is a side view of the harness illustrating its application and use;

Fig. 2 is a perspective view of the harness shown in Fig. 1.

It will be understood that in fishing with a harness the angler is seated on a stool or chair and the bottom of the rod is in a socket in the front of the chair seat. The back of the chair is often made removable so that the angler may have perfect freedom of movement in "pumping" the fish.

My improved harness in the preferred form illustrated comprises a substantial back piece 5 which may substantially cover the back of the wearer and be made of any suitable material. I have found, however, that a heavy grade of leather is very effective for the back piece. In order to secure the greatest effectiveness and provide for the greatest comfort of the angler, it is desirable to shape the back piece in a spinal direction to the form of the wearer so that all parts of the body may take strain incident to pumping of the fish. Both ex- and incurvatures of the back piece may very conveniently be formed by slitting the back piece spinally, as indicated at 6, and parts of the material at the slit may be cut away and the edges brought together and securely stitched, as indicated at 7, to provide a relative in- and excurvature; that is, ordinarily, a generally lune-shaped piece will be removed from the back and the edges brought together so as to provide an incurvature at the region of the small of the back. The seam may be reinforced at the outside by a leather reinforcing strip 8 so as to provide for greater strength and produce a finished looking article.

The back piece is provided with extensions 9—9 to extend over the shoulders and is also provided with bottom extensions 10—10 so as to fit over the general region of the hips. Between the shoulders and hips the back piece is preferably cut out so as to provide for perfect freedom of motion of the wearer. The harness is attached to the reel frame preferably by means of swivel snap hooks 11—11 which snap into holes in the reel frame in the usual manner. The snap hooks may be secured by means of straps to rings 12. Straps 13 form loops at opposite sides of the wearer and these loops have a sliding connection with the reel which sliding connection may be conveniently formed by simply slipping the strap through the rings 12 and securing the same to the back piece. As illustrated, the straps 13 are securely connected at 14 to the back piece about midway of the back, that is, substantially down from the armpits and almost down to the waist. The straps 13 after passing through the rings 12 are connected by means of buckles 15—15 for adjustment to the shoulder extensions 9—9. Thus, when the angler swings backward and forward from the hips in "pumping" a fish, the strain on the ends of the loops will be substantially equalized by reason of the sliding connection of each loop strap 13 with the reel connection or ring 12. In addition to the straps 13 there are preferably also provided hip straps 16—16 adjustably connected to the hip extensions 10 as by means of buckles 17—17 and secured to the rings 12. These hip straps greatly assist the fisherman in holding his rod properly seated as the upper part of his body moves forward to effect a gain on the line in the act of pumping in a fish. On the backward movement the strain is taken chiefly by the upper part of the fisherman's body through the loop straps 13—13, which strain is equalized above and below the shoulders by reason of the sliding engagement of the loops with their connections 12. With the three points of connection of the strap means to the reel, that is, above the shoulders, below the shoulders, and about at the hipline, and with the equalization of strains by reason of the sliding connection, it will be seen that substantially all parts of the back take parts of the strain incident to pumping of the fish and the operation is far less tiring to the angler than with any other harness with which I am familiar. By means of the adjustable straps, the exact desired adjustment between the body of the angler and the reel can easily be effected so as to produce the greatest degree of comfort in the wearer.

While the invention has been described in considerable detail and one preferred form illustrated, it is to be understood that various changes, additions, and omissions may be made within the scope of the invention as defined in the appended claims.

I claim:

1. In a fishing harness, a back piece to engage the back of a wearer, straps at the hipline, a strap secured to said back piece above the shoulder and below the shoulder, and means for connecting said hip strap to a reel, said strap connected to said back piece above and below the shoulder having a sliding connection with said means for connecting said hip strap to a reel.

2. In a fishing harnes, a back piece to engage the back of a wearer, straps adjustably connected thereto at about the hipline, rings connected to said straps, straps connected to said back piece above the shoulders at one end and below the shoulders at the other end and passing through said rings, and means for connecting said rings to a reel.

3. In a fishing harness, a back piece having portions extending over the shoulders and having parts extending forwardly over the body at about the hipline, straps adjustably connected to said parts at about the hipline, strap means connected to parts of said back piece extending over the shoulders and connected to said back piece at points below the shoulders, means for connecting all of said straps to a reel, said means having a sliding connection with said strap means connected to said back piece above and below the shoulders, for the purpose described.

4. In a fishing harness, a back piece to substantially cover the back of a wearer and having extensions fitting over the tops of the shoulders of a wearer, said back piece having side extensions fitting substantially over the hips of a wearer, straps adjustably connected to said hip extensions, straps connected to said shoulder extensions and to the body of said back piece below the shoulders, and means for connecting all of said straps to a reel.

5. In a fishing harness, a back piece to engage the back of a wearer, straps to be connected thereto at opposite sides above and below the shoulders of the wearer and forming, respectively, forwardly extending loops at opposite sides of the wearer, other straps extending forwardly from the lower opposite sides of the back piece and slidably connected with said loops, with means extending forwardly from said slidable connections for attaching said harness to a fishing rig.

6. In a fishing harness, a back piece, straps at opposite sides thereof extending forwardly therefrom to form loops at opposite sides of the wearer, a slide for each loop, straps extending forwardly from the lower part of said back piece for connection respectively with said slides, and means for connecting said slides to a fishing rig.

WILLIAM F. BAXTER.